H. HESS.
ANTIFRICTION BEARING.
APPLICATION FILED SEPT. 29, 1909.
1,027,542.
Patented May 28, 1912.
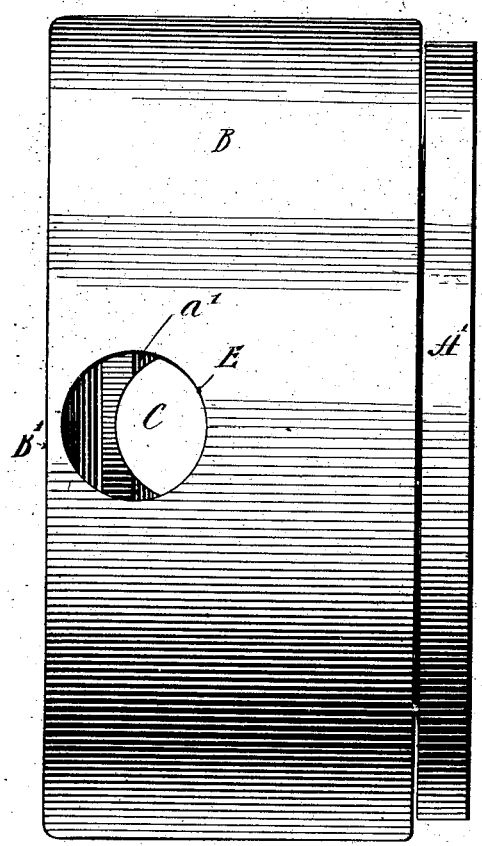
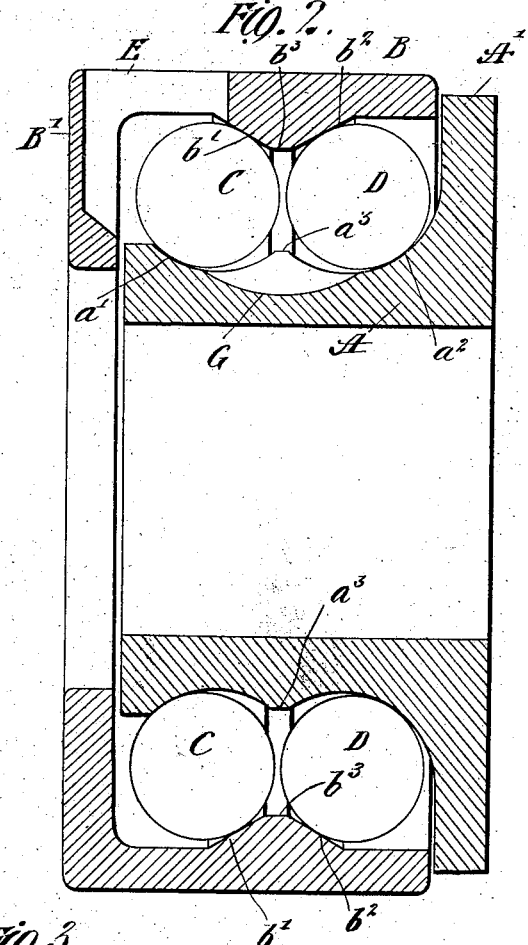
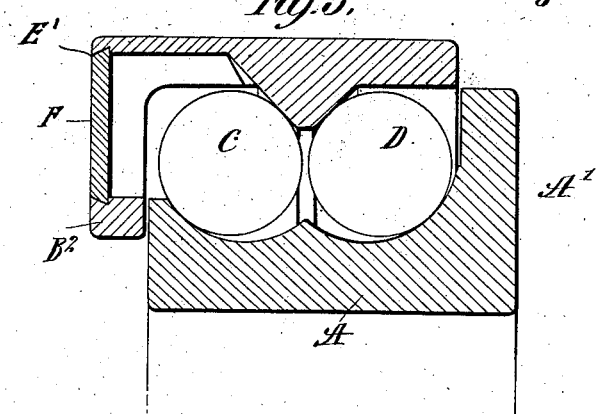
Witnesses:
Inventor:
HENRY HESS
By his Attorneys

UNITED STATES PATENT OFFICE.

HENRY HESS, OF WAWA, PENNSYLVANIA, ASSIGNOR TO THE HESS-BRIGHT MANUFACTURING COMPANY, OF PHILADELPHIA, PENNSYLVANIA, A CORPORATION OF DELAWARE.

ANTIFRICTION-BEARING.

1,027,542.  Specification of Letters Patent.  Patented May 28, 1912.

Application filed September 29, 1909. Serial No. 520,100.

*To all whom it may concern:*

Be it known that I, HENRY HESS, a citizen of the United States, residing at Wawa, in the county of Delaware and State of Pennsylvania, have invented certain new and useful Improvements in Antifriction-Bearings, of which the following is a specification, reference being had therein to the accompanying drawing.

My invention relates to anti-friction bearings, and more particularly to that type thereof wherein the casing members are provided with a plurality of raceways and a corresponding plurality of series of rolling elements are located therein. As is well known in the art various methods of assembling such bearings have been employed. For instance in the "silent" type, the parts are sometimes assembled and disassembled by the eccentric displacement of the casing members in accordance with the well-known Conrad method, and sometimes by the use of filling openings, and in other well-known ways. In bearings of the "full" type, various expedients have also been resorted to, such for instance as forming one or more of the casing members in sections, or by the provision of filling openings, and the like.

It is one of the purposes of my present invention to form uninterrupted and continuous raceways for the rolling elements, and also to connect the several raceways with each other in such manner that the rolling elements may be transferred from one to the other. The function and capability last mentioned are valuable either for purposes of assemblage, or when for any reason it becomes desirable or necessary to pass one or more of the rolling elements from one raceway to another. After the rolling elements are mounted in their respective raceways, the parts are held together thereby and locked, so as to constitute what is known in the art as a "unit-handling" bearing.

Another purpose of my invention is to provide a "closed" bearing, that is to say, one in which the operative parts are protected from dust and other foreign matter which might impair their efficiency.

In the accompanying drawing I have shown my invention as applied in preferred form, but I do not confine myself to this type, as it is obviously applicable to anti-friction bearings of other kinds; and generally speaking, I do not desire to limit myself to any particular embodiment or details except in so far as such limitations are specified in the claims.

Referring to the drawing: Figure 1 is an edge view of a bearing of the type referred to, having my invention applied thereto; Fig. 2 is a transverse sectional view thereof; and Fig. 3 is a similar view illustrating a slightly modified form.

Referring first to Figs. 1 and 2, the bearing there illustrated comprises an inner casing member A, an outer casing member B, with two series of balls C and D located between them. The series of balls C travel upon the tracks or ways $a^{-1}$, $b^{-1}$, and the series of balls D travel upon the tracks or ways $a^{-2}$, $b^{-2}$, the said tracks or ways being formed in the respective casing members A and B, as shown in the drawing. It is noted that the tracks or ways $a^{-1}$, $a^{-2}$, of the casing member A, are separated by the flange or rib $a^{-3}$, and that the tracks or ways $b^{-1}$, $b^{-2}$, of the casing member B, are separated by the flange or rib $b^{-3}$. In order to permit the transfer of the balls from one raceway to the other, I connect them by a transverse groove or passage G formed in one of these flanges or ribs, for instance and as shown in the drawing, in the flange $a^{-3}$ of the casing member A. This groove G is formed of sufficient depth to permit the passage of a ball beneath the opposed flange or rib $b^{-3}$, and the groove is so shaped and constricted as not to interrupt or interfere with either of the tracks or ways $a^{-1}$, $a^{-2}$. Due to this constriction, the balls in their passage from the groove to one track or to the other are subjected to some slight force or distortion, which is permitted by the elasticity of the materials employed, in the manner well understood in the art, the object of this arrangement being to guard against the accidental displacement of the balls, and to preserve the continuity of the effective portion of the track or way.

The casing members A and B are each formed with a projecting flange, $A^1$ and $B^1$, respectively, at opposite sides of the bearing, each of the said flanges extending to and overlapping the side of the opposed casing member, as shown in the drawing, in such manner as to prevent or reduce the admission of dust or other foreign matter to the working parts, and thus constituting a closed or dust-proof bearing. In order to permit the insertion of the balls between the casing members, I form in one of them, for instance the member B (see Fig. 2), a filling opening E, whereby the balls may be introduced to the raceway $a-^1$, $b-^1$, and from which if desired they may be transferred through the groove or passage G to the raceway $a-^2$, $b-^2$. The filling opening E, being formed in the outer surface of the member B, is normally closed by the contiguous mechanism when the bearing is applied in working position, and therefore no special means, such as plugs and the like, are required for that purpose.

In Fig. 3 I have shown a modified form, wherein the filling opening $E^1$ is formed in the side of the projecting flange $B^2$, and in this instance it is preferably closed by a plate F, which engages in the dovetail or under-cut sides of the filling opening. In both instances it will be seen that due precautions are taken to prevent the entry of dirt or other deleterious substances.

In the form of bearing illustrated, one obvious mode of assemblage would be,—first, to locate the balls D in the track or way $a-^2$ of the casing member A; second, to pass the casing member B thereover until the track or way $b-^2$ engages with the balls D; and finally, to introduce the series of balls C into place through the external filling opening. However, such mode of assemblage is simply incidental to the particular form of bearing shown by way of example in the drawing, and the one specially contemplated in the present application, and which is obviously capable of application in other forms also, is as follows: First, the two casing members are arranged in operative and concentric relations; second, the balls D are introduced through the filling opening into the raceway $a-^1$, $b-^1$; third, the balls D are then passed one by one through the groove or passage G into the raceway $a-^2$, $b-^2$, as previously described; and finally, the balls C are introduced through the filling opening into the raceway $a-^1$, $b-^1$; it being noted that the balls C, because of their engagement with their tracks or ways, serve to hold the parts together in such manner as to provide a bearing of the self-contained or unit-handling variety. The groove or passage G may also be employed when, for any reason, it is deemed desirable or necessary to transfer a ball from one raceway to the other.

As previously stated, the invention may be applied in many ways, and obviously many changes and variations will suggest themselves to those skilled in the art without departing from its spirit.

Having thus described my invention, its construction and mode of operation, what I claim and desire to secure by Letters Patent of the United States is as follows:

1. In an anti-friction bearing, the combination of casing members provided with a plurality of raceways and a corresponding plurality of series of rolling elements located therein, the said raceways being connected by a groove or passage, whereby the rolling elements may be transferred from one to the other, and the said groove or passage being so constricted as to necessitate distortion of the parts in the transfer of the rolling elements therethrough.

2. In an anti-friction bearing, the combination of casing members provided with a plurality of raceways and a corresponding plurality of series of rolling elements located therein, the contiguous raceways being separated by flanges or ribs, and being connected by a groove or passage formed in a flange or rib, whereby the rolling elements may be transferred from one to the other, and the said groove or passage being so constricted as to necessitate distortion of the parts in the transfer of the rolling elements therethrough.

3. In an anti-friction bearing, the combination of casing members provided with a plurality of raceways and a corresponding plurality of series of rolling elements located therein, the said raceways being connected by a groove or passage, whereby the rolling elements may be transferred from one to the other, and the said groove or passage being so constricted as to necessitate distortion of the parts in the transfer of the rolling elements therethrough, and one of the casing members being formed with a filling opening, whereby the rolling elements may be introduced into one of the raceways.

4. In an anti-friction bearing, the combination of casing members provided with a plurality of raceways and a corresponding plurality of series of rolling elements located therein, the said raceways communicating with each other by a constricted groove or passage so that the rolling elements may be transferred by distortion therethrough, and one of the casing members being formed with a filling opening leading to one of the raceways so that the rolling elements may be admitted thereto.

5. In an anti-friction bearing, the combination of casing members provided with a plurality of raceways and a corresponding plurality of series of rolling elements located therein, the contiguous raceways being separated by flanges or ribs, and being connected by a groove or passage formed in one of the flanges or ribs, whereby the rolling elements may be transferred from one to the other, and the said groove or passage being constricted in the direction of the opposing rib or flange so as to necessitate distortion of the parts in the transfer of the rolling elements therethrough.

In testimony whereof I have affixed my signature in presence of two witnesses.

HENRY HESS.

Witnesses:
 THEO. H. M'CALLA,
 JOHN S. CLEMENT.

Copies of this patent may be obtained for five cents each, by addressing the "Commissioner of Patents. Washington, D. C."